United States Patent [19]

Johnson

[11] 4,128,209

[45] Dec. 5, 1978

[54] AIR GUN

[75] Inventor: John L. Johnson, Morrisville, N.C.

[73] Assignee: Scovill Manufacturing Company, Waterbury, Conn.

[21] Appl. No.: 832,596

[22] Filed: Sep. 12, 1977

[51] Int. Cl.² .................................................. F16K 3/24
[52] U.S. Cl. ..................................... 239/583; 239/291; 239/530; 251/343
[58] Field of Search ............... 239/DIG. 22, 291, 530, 239/583; 251/343; 137/454.2

[56] References Cited

U.S. PATENT DOCUMENTS 3,599,876  8/1971  Kyburg .............................. 239/291

FOREIGN PATENT DOCUMENTS 1425900  4/1969  Fed. Rep. of Germany .......... 239/583

Primary Examiner—Robert W. Saifer
Attorney, Agent, or Firm—Dallett Hoopes

[57] ABSTRACT

Inexpensive air gun has body with internal fixed coaxial tubular element having closed end with radial openings. A tubular valve element is reciprocal on the tubular element to valve off the radial openings. Tubular valve element is operable by actuator from outside body. The valve element has pressure-balanced surfaces for ease of operation.

9 Claims, 6 Drawing Figures

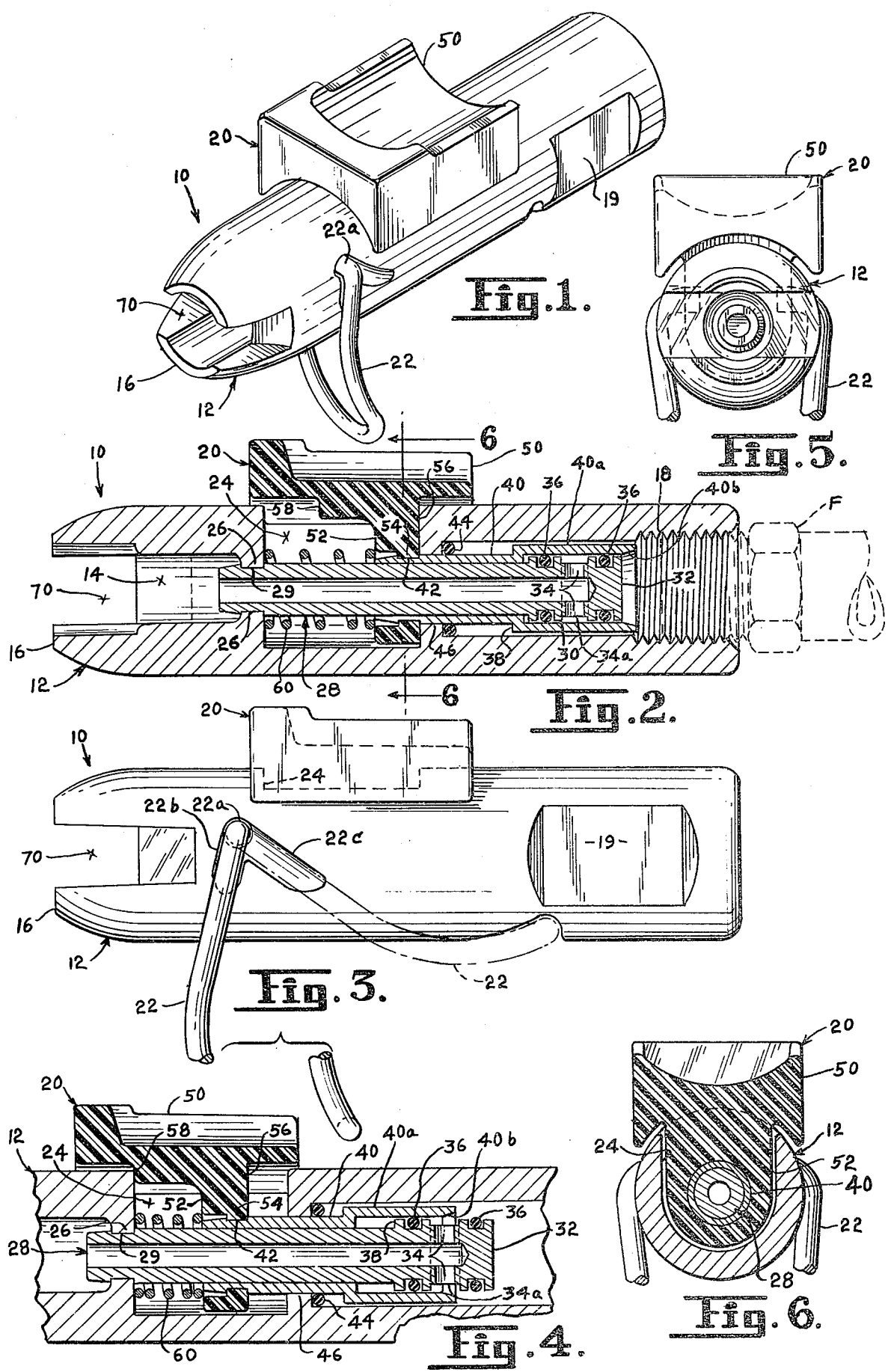

AIR GUN

BACKGROUND OF THE INVENTION

1. Field of the Invention

This invention relates to an air gun of the type secured to the end of a flexible hose and usually used to direct air towards a work table or workpiece to clean it off. More specifically, this invention relates to a low-cost air gun having a balanced pressure valve disposed coaxially with the body of the gun. It is simple and inexpensive to manufacture.

2. Description of the Prior Art

There are a number of air guns in the prior art. Examples are U.S. Pat. No. 2,917,244, issued Dec. 15, 1959 to Gould, and U.S. Pat. No. 3,129,892, issued Apr. 21, 1964 to Tillman. Prior devices have involved multi-directional boring of a housing or body and a plurality of parts. They have generally been complicated and expensive.

SUMMARY OF THE INVENTION

In the present invention, the body of the gun has an axial bore and the valve of the gun includes coaxial telescoping elements. The valve is balanced so that irrespective of the air pressure, the pressure does not bias the valve toward open or closed condition. The present gun is inexpensive and easy to manufacture and assemble.

BRIEF DESCRIPTION OF THE DRAWINGS

Further features and objects of the invention will be apparent from a reading of the following specification and reference to the appended drawings, all disclosing a non-limiting embodiment of the invention. In the drawings:

FIG. 1 is a perspective view of a gun embodying the invention;

FIG. 2 is a sectional view along the axis and showing a hose fitting in phantom;

FIG. 3 is a side elevational view;

FIG. 4 is a fragmentary view comparable to FIG. 2 but showing the valve in open condition;

FIG. 5 is a front end view; and

FIG. 6 is a sectional view taken on the line 6—6 of FIG. 2.

DESCRIPTION OF THE PREFERRED EMBODIMENT

Referring more specifically to the drawings, a gun embodying the invention is generally designated 10 in FIG. 1. It comprises a barrel or body 12 having an axial bore 14 and formed with a nozzle 16 at one end, the downstream end, and a threaded zone 18 at the other or upstream end (FIG. 2) adapted to receive a hose fitting F. Wrench flats are provided on opposite sides as at 19.

In exterior appearance (FIG. 1), it can be seen that the gun includes an actuator thumbpiece 20 and a hanging hook 22.

From the sectional view (FIG. 2) it is seen that the body is formed with a lateral opening 24 which intercepts the axial bore 14 intermediate the ends of the body. An inward flange 26 is formed in the bore at one end of the lateral opening and a tubular element 28, formed with a circumferential groove 29, is disposed fixedly axially of the housing, the flange 26 being secured in the groove 29.

At the upstream end, the tubular element 28 terminates in in a spool portion 30 comprising a closed end 32, and radial opening means 34 in the spool portion connect with the axial opening of the tubular element 28 and a circumferential recess in the spool portion as at 34a. the spool portion 30 is formed with a pair of circumferential grooves on opposite sides of the radial opening means 34, the grooves being fitted with "O" rings 36. The tubular element 28 is enlarged at the area of the spool portion to form an annular shoulder 38.

A tubular valve member 40 is provided and snugly fits over the tubular element 28. it includes an enlarged portion 40a adapted to slide over the spool portion 30, and is movable back and forth over the tubular element 28 to alternately expose or close off the radial opening means 34 (compare FIGS. 2, 4) to open or close the valve. the downstream end of the tubular valve element is formed with a peripheral groove 42 which is disposed in the area of the lateral opening 24 irrespective of whether the valve is opened or closed. As shown, the upstream end of the valve element carries an interior bevel 40b to ease assembly.

Sealing means comprising an O-ring 44 is disposed between the valve element and the housing 12 and is held in position by an inward flange 46 in the body at the rightward side of the lateral opening 24, as shown, to seal the two parts. The flange 46 also serves to center the rightward ends of the tubular element 28 and valve 40.

As mentioned, an actuator 20 is provided and includes a thumbpiece 50 having a curved undersurface conforming to the body 12 and covering the opening of the lateral opening 24. To the thumbpiece is integrally formed a leg 52 which extends into the opening 24 and is apertured to present about the aperture the inward flange 54 which fixedly engages in the groove 42 in the valve. Opposite surfaces 56 and 58 are formed on the leg 52 and alternately engage the opposite sides of the lateral opening 24 to limit the travel of the actuator.

The element 28 is surrounded by an axial spring 60 compressively disposed between the leftward side of the opening 24 and the leg 52 of the thumbpiece, as shown, biasing the valve so that the enlargement 40a covers the radial openings 34.

It will be noted that the valve of the air gun described is normally disposed in the closed position due to the bias of spring 60. It is readily opened by pushing the thumbpiece 50 forward against the urging of the spring 60. This permits air from the fitting F to pass through openings 34 (FIG. 4), through the tubular element 28, and out the nozzle 16.

For safety reasons, the opening in the nozzle 16 is formed with lateral cut-outs or notches 70.

A special feature of the invention is that the effective area of the upstream end of the valve 40 is approximately the same as the area of the annular shoulder 38 so that air under pressure in the chamber, or immediately surrounding the valve and rightward of the seal 44 as shown in FIG. 2, is balanced in its effect on the valve 40. Thus, irrespective of what pressure is employed, the spring 60 is the only bias operating on the valve and the thumb pressure required to operate the valve is always the same.

The swing hook 22 is of "U" shape, as shown, and has inward pintles 22a which fit into appropriate openings in the side of the body. The body is grooved at two separate angles 22b and 22c vectoring from the pintle-receiving openings so that the natural resilence of the U-shaped hook 22 biases it towards one of the two positions shown alternately in FIG. 3 either the hanging position (full line) or the collapsed position (broken line) against the body.

It will be seen that while the present air gun has features of some of the more expensive guns, its axial arrangement permits easy manufacture and assembly, and especially due to the balanced nature of the valve, the operation is uniform and reproducible.

While the invention has been shown in but on embodiment, it is not so limited, its scope being limited only as defined in the following claim language:

I claim:

1. An air gun comprising an elongate body being formed with an axial bore and a lateral opening in from the side intercepting the bore, a tubular element having an axial opening and being coaxial with the body and secured in the body at one side of the lateral opening and extending in the lateral opening and therebeyond toward the upstream end of the body to terminate in the body in a spool portion including a closed outward end and radial opening means communicating with the axial opening of the tubular element, the upstream end of the body adapted to be connected to an air hose and the opposite end of the body being formed with nozzle means, tubular valve means on the tubular element and snugly engaging the spool portion and adapted to be slid back and forth to cover or uncover the radial opening means, the valve means being accessible through the lateral opening, sealing means circumposing the valve means and sealingly engaging the body and the valve means, and actuator means secured to the valve means in the lateral opening and extending out the lateral opening and adapted to be hand-shifted to move the valve means to cover or uncover the radial opening means.

2. An air gun as claimed in claim 1 wherein the spool portion is formed with peripheral grooves in either side of the radial opening means and O-rings are provided in the grooves respectively, the O-rings sealing between the spool portion and the valve means.

3. An air gun as claimed in claim 1 wherein the upstream end surface of the valve means adjacent the spool means has a certain effective cross-sectional area and the valve on the inward side of the spool is reduced in diameter to define an external annular shoulder having approximately the same effective cross-sectional area whereby the air pressure tending to move the valve means axially is balanced.

4. An air gun as claimed in claim 1 wherein the body has an inward annular flange on said one side of the lateral opening and the tubular element is peripherally grooved, and the groove receives the end of the flange to comprise the said securing of the body to the tubular element.

5. An air gun as claimed in claim 4 wherein spring means are disposed about the tubular element and held compressively between the flange and the actuator to bias the valve in covering position.

6. An air gun as claimed in claim 1 wherein the actuator includes means covering the lateral recess.

7. An air gun as claimed in claim 1 wherein the actuator includes means cooperating with the opposite sides of the lateral opening to limit travel of the valve.

8. An air gun as claimed in claim 1 wherein the nozzle means includes an axial opening and radial passage means extending outward from the axial bore adjacent the nozzle end.

9. An air gun as claimed in claim 1 wherein the valve means is formed with a peripheral groove at its end opposite the portion engaging the spool and the actuator is attached to the valve means by being apertured and the margin of the aperture receives the groove in snap installation.

* * * * *